(No Model.)

G. W. LESTER.
TONGUE SUPPORT.

No. 468,879. Patented Feb. 16, 1892.

Witnesses.
C. N. Kinney,
Anna O. Faust.

Inventor.
George W. Lester
By C. T. Benedict
Attorney.

UNITED STATES PATENT OFFICE.

GEORGE W. LESTER, OF RACINE, WISCONSIN.

TONGUE-SUPPORT.

SPECIFICATION forming part of Letters Patent No. 468,879, dated February 16, 1892.

Application filed November 14, 1891. Serial No. 411,855. (No model.)

*To all whom it may concern:*

Be it known that I, GEORGE W. LESTER, of Racine, in the county of Racine and State of Wisconsin, have invented a new and useful Improvement in Tongue-Supports, of which the following is a description, reference being had to the accompanying drawings, which are a part of this specification.

My invention relates to a device that is adapted to support the tongue or pole of a vehicle in a substantially horizontal position and also in an oblique or substantially vertical position. The device is adapted to be used with carriages such as are in common use throughout the country, and with slight modifications, such as any mechanic would readily make, the device is adapted to support the thills of a buggy or carriage in the same manner as the one herein shown and described supports the tongue of the vehicle.

Figure 1:
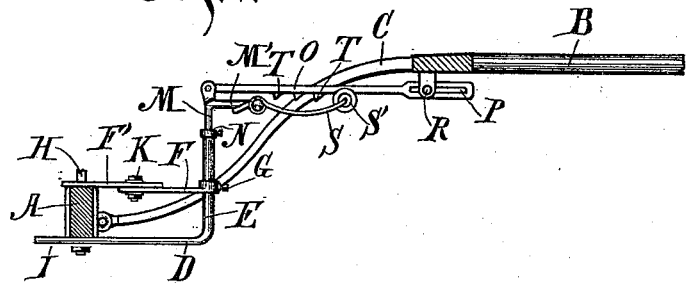
Figure 2:
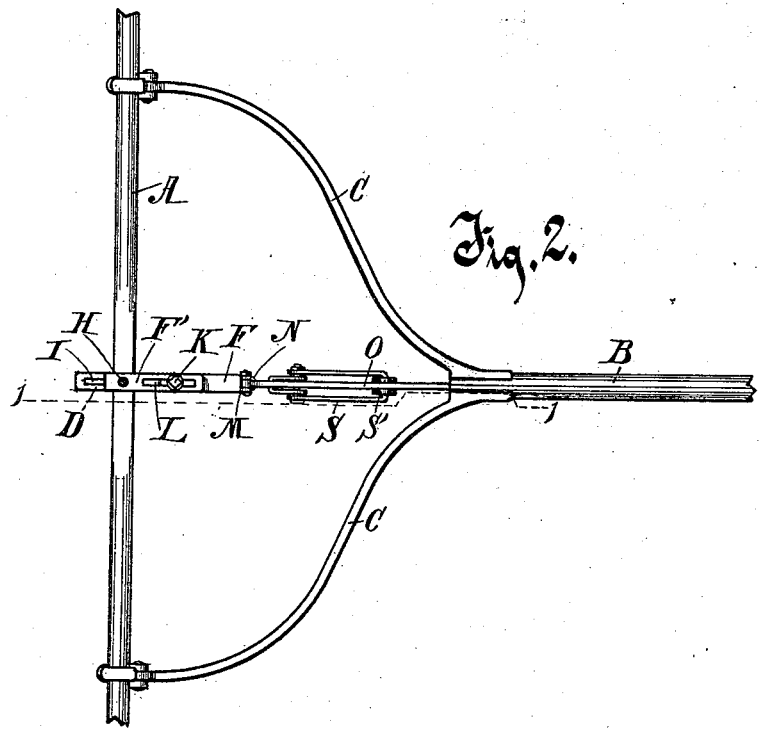

In the drawings, Figure 1 is a side elevation of my improved device in connection with a fragment of the pole of a vehicle and the axle, in cross-section, to which it is attached, the view being taken on line 1 1 of Fig. 2. Fig. 2 is a top plan view of my device shown in connection with a fragment of the tongue and front axle of a vehicle.

A is the axle of a carriage.

B is the pole or tongue of the carriage, provided with branching hounds C C, by and through which it is hinged so as to have vertical movement to the axle A.

My improved device is constructed, preferably, of metal and has a horizontally-disposed bar D, formed integrally with an upwardly-projecting upright part E. The part E is hollow and is conveniently made of a piece of gas-pipe, which, being turned at right angles thereto and flattened therefor, forms the part or bar D. A brace formed in two parts F F' has at one end an eye or collar fitted to and movable on the upright E and secured adjustably thereto by the set-screw G. At the other extremity the brace receives therein the king-bolt H or other equivalent bolt, which passes through the brace, through the axle A, and through the bar D, and is secured in position by a suitable nut thereon. The bolt H passes through the bar D in a longitudinal slot I. The parts F and F' of the brace overlap each other and are secured adjustably together by the bolt K, the bolt for the purpose of the adjustment of the parts endwise on each other passing through a slot L in one part of the brace. By means of the endwise adjustment of the parts F and F' on each other and of the bar D on the bolt H the upright E can be adjusted to a position nearer to or farther from the axle H, as desired, to adapt it for use with tongues or poles having hounds of greater or less forward and rearward extension.

A post M, fitted and revoluble in the upright E, is provided with a collar N, secured adjustably thereto by a set-screw, which rests on the top of the upright E and supports the post and by its vertical adjustment on the post is adapted to regulate the height to which the post projects above the upright. This adjustment adapts the device for use with vehicles in which the hounds are bent upward to different heights, the supporting-arm of the device being thus adapted to be raised or lowered to accommodate it to poles nearer to or farther from the horizontal plane of the axle.

A forwardly-projecting arm O is hinged at its rear end to suitable ears therefor on the post M and at its forward end is provided with a slot P, through which the pin R is received movably, which pin is inserted in a lug or lugs therefor rigid to the under side of the pole B. This construction permits the pole B to vibrate vertically when the vehicle is in use and also to be swung up at an oblique angle, or nearly vertically, when not in use.

A forwardly-projecting spring S, secured permanently at its rear end to the post M, conveniently by means of a forwardly-projecting integral arm M', bears at its free end against and supports the arm O. This spring is conveniently made of suitable steel wire or rod in a looped form and carries in its outer end an anti-friction roller S', preferably channeled to serve as a guide, which receives the bearing of the arm O on the spring and is adapted to revolve against the arm as the arm is swung upwardly. This spring is adapted to support the pole yieldingly in a substantially horizontal position, or in an oblique or substantially vertical position when the pole is lifted thereto. There are also catches T on the under side of the arm O, adapted to engage the extremity of the spring S, whereby the arm O and the pole are supported in an oblique or substantially vertical position. The spring when so engaged in a catch T serves more properly as a brace to hold the arm O and the pole in a constant position.

What I claim as my invention, and desire to secure by Letters Patent, is—

1. A device for supporting a carriage-pole, comprising a bar and an upright adapted to be secured to the axle of a vehicle, a post supported on and movable in the upright, a swinging arm hinged to the post, and a spring fixed to the post, adapted to support the swinging arm yieldingly, substantially as described.

2. In a device for supporting a carriage-pole, the combination, with a bar adapted to be secured to the axle of a vehicle and an upright rigid thereon, of a post revoluble and adjustable in the upright, a swinging arm hinged thereto and connected movably at its free end to the pole, and a spring fixed on the post and bearing yieldingly against the swinging arm, substantially as described.

3. In a device for supporting a vehicle-tongue, the combination, with a bar adapted to be secured to the axle of the vehicle and a hollow upright rigid thereto, of a post revoluble in the upright and provided with a collar secured thereto by a set-screw, whereby the post is adapted to be adjusted vertically, of a swinging arm hinged to the post and bearing at its free end against the under side of the pole, and a spring fixed to an arm integral with the post and bearing at its free end against and supporting the swinging arm, substantially as described.

4. In a device for supporting a vehicle-tongue, the combination, with an upright attached to the axle of a vehicle, of a post supported movably in the upright, a swinging arm hinged on the post and bearing at its free end against the pole, a spring fixed on the post and bearing against and supporting the swinging arm, and catches on the swinging arm, adapted, when the swinging arm is in an oblique or vertical position, to engage the spring and be locked in position thereby, substantially as described.

5. In a device for supporting a vehicle-tongue, a horizontally-disposed bar provided with an elongated slot, an upright integral with the bar, and a brace formed in two parts, the joining ends of which overlap each other and are secured adjustably together by a bolt passing through a slot in one part of the brace, which brace is secured at one end adjustably to the upright and at the other extremity is secured to the axle of the vehicle, the adjustable connection between the parts of the brace and the slot in the bar being adapted to permit of an adjustment of the upright toward and from the axle of the vehicle, substantially as described.

In testimony whereof I affix my signature in presence of two witnesses.

GEORGE W. LESTER.

Witnesses:
C. T. BENEDICT,
ANNA V. FAUST.